United States Patent [19]
Baldwin

[11] 3,921,132

[45] Nov. 18, 1975

[54] DIGITAL RECORDING APPARATUS ESPECIALLY FOR TELEVISION SIGNALS

[75] Inventor: John Lewis Edwin Baldwin, Croydon, England

[73] Assignee: Independent Broadcasting Authority, London, England

[22] Filed: Aug. 22, 1973

[21] Appl. No.: 390,376

[30] Foreign Application Priority Data

Aug. 24, 1972 United Kingdom............... 39605/72

[52] U.S. Cl.......................... 340/146.1 AG; 360/33

[51] Int. Cl.$^{2}$.......................................... G06F 11/10

[58] Field of Search......... 340/146.1 AG, 146.1 AL, 340/174.1 B; 179/100.2 B, 100.2 T; 178/6.6 R, 6.6 A, 6.6 DC; 360/33, 38, 53

[56] References Cited

UNITED STATES PATENTS

| | | | |
|---|---|---|---|
| 3,144,635 | 8/1964 | Brown et al. | 340/146.1 AL |
| 3,322,892 | 5/1967 | Yasuoka et al. | 178/6.6 DC |
| 3,328,759 | 6/1967 | Blaauw et al. | 340/146.1 AL |
| 3,384,708 | 5/1968 | Stosberg | 178/6.6 DC |
| 3,622,981 | 11/1971 | Greenbaum | 340/146.1 AG |
| 3,639,900 | 2/1972 | Hinz | 340/146.1 AL |
| 3,721,773 | 3/1973 | Kluge | 179/100.2 T |
| 3,729,708 | 4/1973 | Wolfer et al. | 340/174.1 B |

*Primary Examiner*—Charles E. Atkinson
*Attorney, Agent, or Firm*—A. W. Breiner

[57] ABSTRACT

The invention provides a recording or reproducing apparatus for digital words, e.g. digital words defining video signals, has a set of recording and/or reproducing heads arranged to be in recording or reproducing relationship with a recording medium simultaneously, at least one of said heads when in said relationship being arranged to record or reproduce one or more bits of a digital word and also a parity bit derived from bits being recorded or reproduced by one or more other heads in said relationship.

A recording of digital words, also provided by the invention, comprises a recording medium, e.g. of the magnetic type, bearing at least two separately and simultaneously readable recordings of bits, at least one of said recordings containing parity bits derived from bits in the other recording or at least one of them.

7 Claims, 8 Drawing Figures

DIGITAL RECORDING APPARATUS ESPECIALLY FOR TELEVISION SIGNALS

Figure 1:
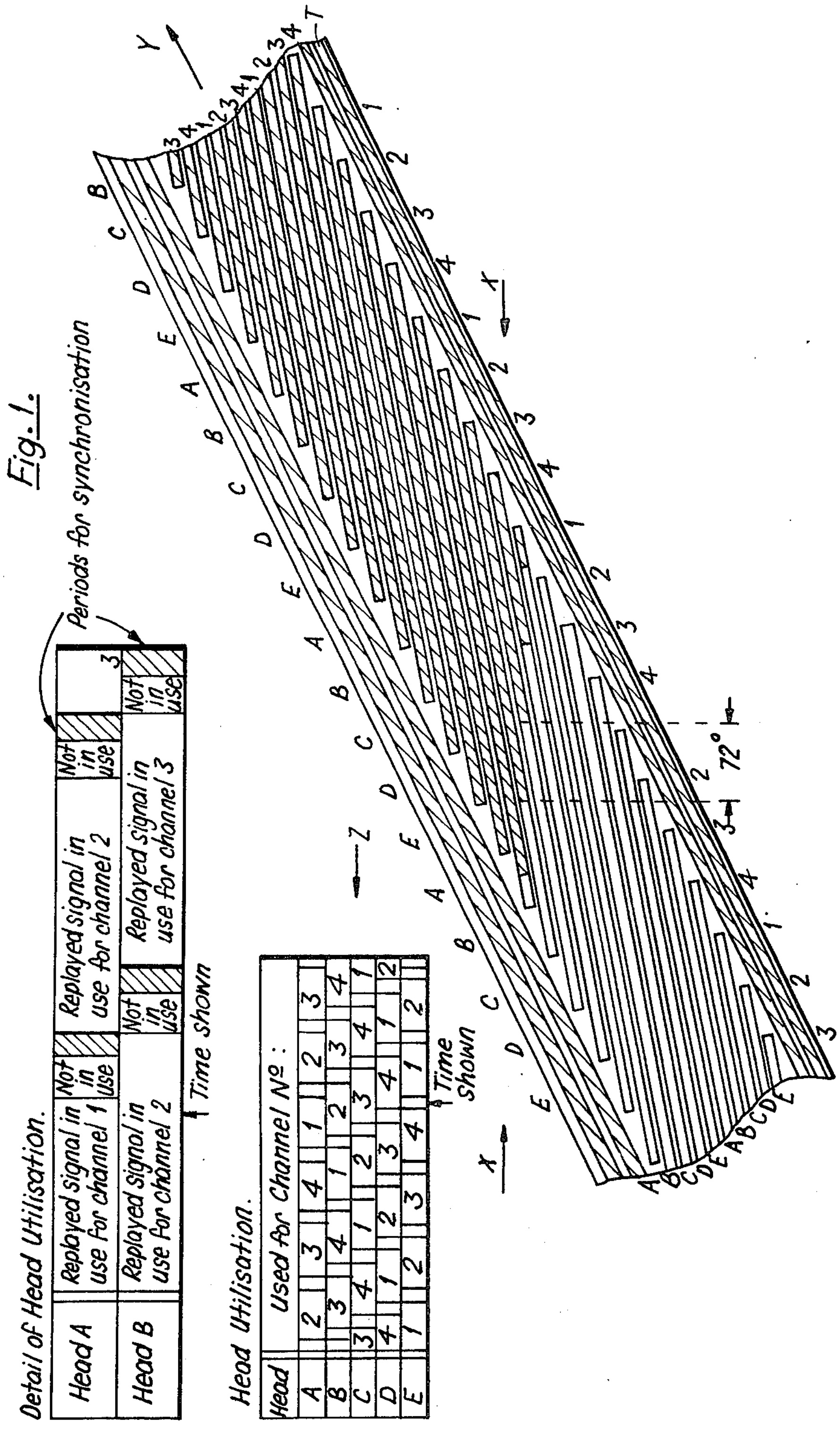

The present invention has as an object the provision of apparatus for processing signals in a new and advantageous manner, especially when applied to video signals in television systems. A further object of the invention is the provision of recordings of signals in a new and advantageous form. Recordings of video and other signals have many applications, and besides being useful in the preparation of programmes for transmission can have a value as articles of commerce.

In accordance with the present invention, there is provided a recording or reproducing apparatus for digital words said apparatus having a set of recording and/or reproducing heads arranged to be in recording or reproducing relationship with a recording medium simultaneously, at least one of said heads when in said relationship being arranged to record or reproduce one or more bits of a digital word and also a parity bit derived from bits being recorded or reproduced by one or more other heads in said relationship.

Further in accordance with the present invention, there is provided a recording of digital words which comprises a recording medium bearing at least two separately and simultaneously readable recordings of bits, at least one of said recordings containing parity bits derived from bits in the other recording or at least one of them. Normally such a recording is produced using recording apparatus as aforesaid. It is to be understood however that it may be produced in any other convenient way, for example by copying a recording produced by the apparatus. In general, recordings may be copied by reproduction and rerecording or by printing techniques.

Because of its known favourable qualities the recording medium is preferably a recording medium in the form of magnetic tape and the heads are heads designed for use therewith, i.e., magnetic recording and/or reproducing heads (as is known, the same heads are used for recording and reproduction in some kinds of equipment). It is to be understood, however, that recording media of other kinds may be employed if desired without departing from the ambit of the invention. For example, photographic film may be used as the recording medium with heads in the form of appropriate electrical-optical transducers.

For economy of construction of the apparatus and economy of use of the recording medium, the apparatus is preferably arranged such that the parity bit is a function of a proportion only of the bits being recorded or reproduced by the other head or heads, said proportion containing only the more significant bits of the digital words. A convenient arrangement is to arrange that each head records or reproduces parity bits which are a function of the bits being recorded or reproduced by the other head or heads. For example, for words of eight digits such as may be required to represent a video signal in digitised form, there may be employed heads such that four heads are in use at any particular time, each of which handles three bits viz. one of the four more significant bits, one of the four less significant bits and a parity bit which is a function of the most significant bits being handled by other heads, preferably all the other three.

Knowing the function by which the parity bits are derived, it is possible on reproduction to compare the reproduced parity bits with parity bits derived for comparison from the bits reproduced from the other head or heads. On occasion when reproduced parity bits fail to correspond with the derived parity bits, a fault condition is present. Fault conditions affecting the more significant digits are, of course, more important than those affecting the minor ones. Equipment supplied by the reproduced digital words may be arranged to take suitable action in response to the fault condition. For example, a fault serious enough to destroy the acceptability of a part of or a complete line of a television picture may be arranged to cause information from another line to be repeated in its place. Apparatus for producing this repetition is well understood in the art.

Fault conditions can occur for several reasons including local defects in the recording medium, interference picked up in the recording channel, or statistically rare instantaneous noise levels affecting signals in economically designed circuits. The location of the generation of the parity bits should be chosen accordingly.

As will be understood, the automatic detection of significant faults in the recording step itself, the recording medium, or the reproduction step is attractive. Advantage may be taken thereof to economise in the recording medium and/or in the mechanical design of the apparatus, e.g. the track widths used with magnetic recording tape may be made attractively small.

It is convenient to provide the apparatus in such a form that the digital signals are represented only by a qualitative change in the recording medium, e.g. changes of direction of magnetisation of recording tape, rather than by degrees of quantity such as levels of magnetisation. This may be achieved by recording binary digits directly or by representing signal levels or changes of signal level on a time basis so that the recorded information is in the form of signals representing the timing of occurrences, preferably of a binary nature — cf. phase modulation.

For the recording of words at a high bit rate, e.g. as with video signals, it is impracticable to record in tracks extending longitudinally along a magnetic tape. The apparatus when required for such purposes preferably has the recording and/or reproducing heads mounted by a disc or other turret which is rotatable with respect to the direction of longitudinal movement of the medium so that the relative motion of the heads relative to the medium has a transverse component and the heads are carried into and out of recording or reproducing relationship with the medium by rotation of the turret, and the number and positioning of said heads about the turret is greater than the number of heads in said set, and the heads in said set at a particular time are heads mounted by the turret which are in recording or reproducing relationship with the medium. Advantageously the number of heads mounted by the turret is such that the number of heads in recording or reproducing relationship with the medium is at times greater than the number of heads in said set. This arrangement provides time for synchronization before the additional head or heads is brought into normal operation (in place of a head which is to be rotated out of recording or reproducing relationship with the tape). Suitably, the number of heads is five, spaced apart at 72° intervals around the turret.

The following description in which reference is made to the accompanying drawings is given in order to illustrate the invention.

In FIG. 1, the tape is shown as viewed from the centre of rotation of the heads and the widths of the tracks and guard bands therebetween are exaggerated in the interests of clarity. Tape already transversed by the heads is shown shaded and tape about to be traversed is shown unshaded. Arrows X show the plane of the heads, arrow Y shows the direction of travel of the tape and arrow Z shows the direction of movement of the heads.

A typical apparatus according to the invention has tape handling apparatus of generally known mechanical construction. It has five heads A, B, C, D and E spaced at 72° intervals around a drum arranged to have 2 inch videorecording tape which contacts it over 288° or more so that it is contacted by at least four heads at any particular time. To minimise tracking errors the drum is made relatively small, e.g. 10 inches in circumference. The head speed is 1,250 inches per second and the head to tape speed is 1,265 inches per second, the rate of rotation of the drum being 125 revolutions per second. At a tape speed of 15 inches per second the centre-to-centre spacing of the tracks is 0.0048 inch (0.123 mm). The track width is 0.0025 inch (0.0635 mm) giving a guard band of 0.0023 inch (0.0584 mm). This guard band is adequate for 2 inch tape having a length of 8 inches in contact with the drum.

Figure 8:
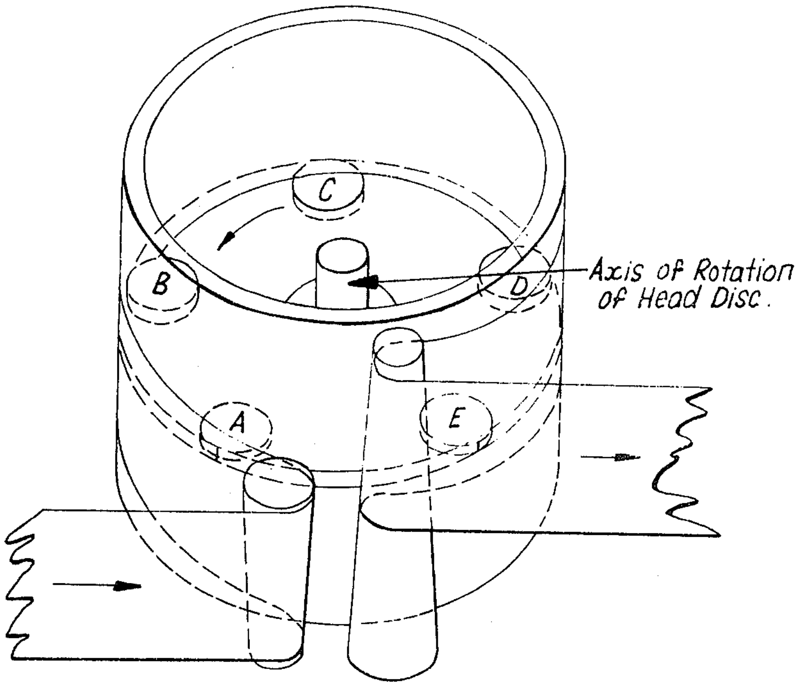

The relationship between the heads and the tape is shown in FIGS. 1 and 8 which are generally self-explanatory, rotors with heads which are moved so that the tape is transversed diagonally being well understood. The four longitudinal tracks shown are available for purposes other than video signal recording, e.g. track may be used as a control track for synchronising purposes.

At any time four heads are in recording or reproducing relationship with the tape. The five are switched so that they handle four channels 1, 2, 3 and 4 in the sequence shown in FIG. 1 in the table "Head Utilisation." Parts of the cycles of operation of two of the heads A and B are shown in another table in FIG. 1. As will be seen there are for each head, periods when the head is not in use for actual reproduction (or recording) of a channel. Parts of these periods are used for synchronization purposes.

Figure 2:
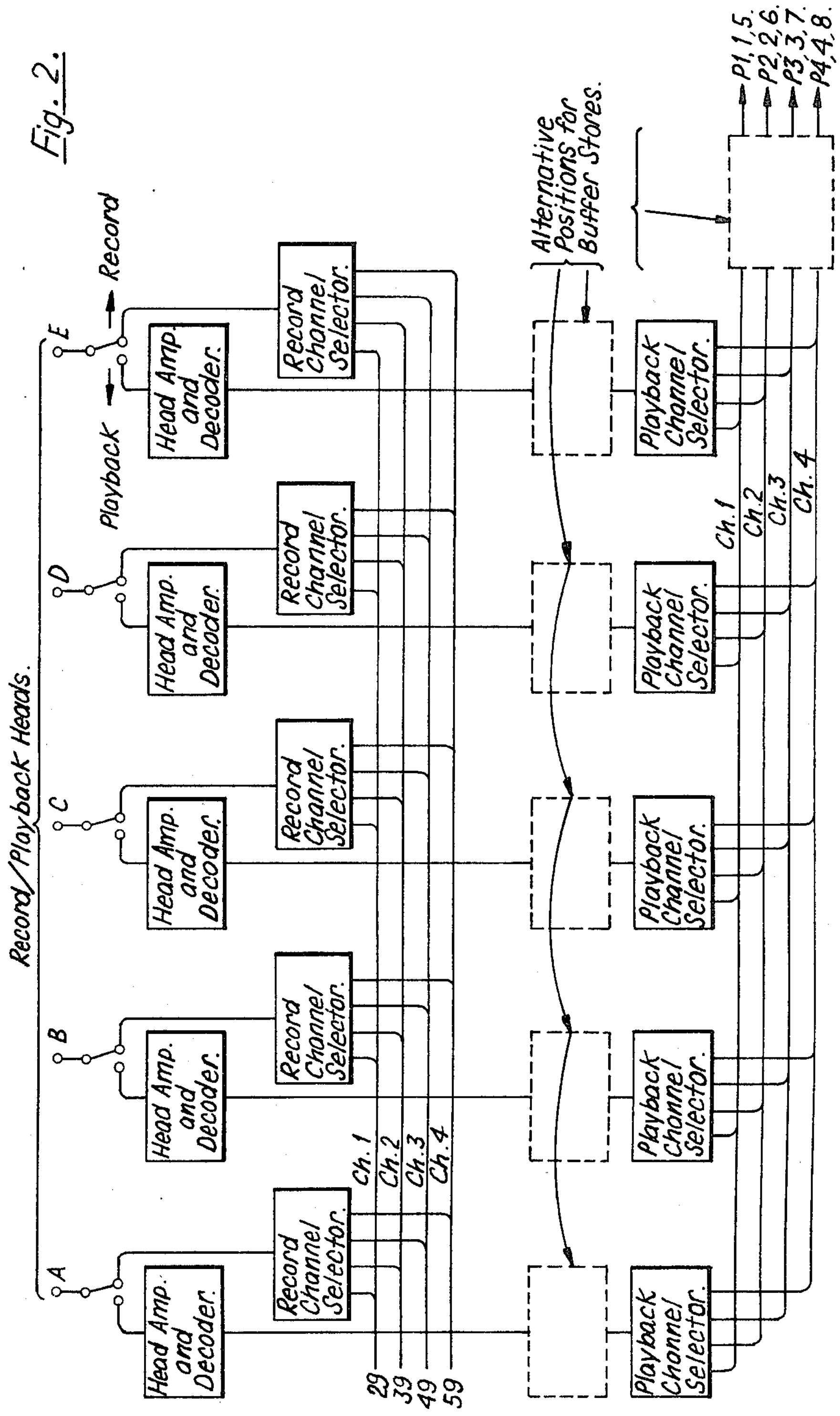

FIG. 2 shows how the four Record Channels Ch1 to Ch4 arriving at inputs 29, 39, 49 and 59 respectively are routed to the five heads A, B, C, D and E during recording and also shows how the signals recovered from the tape pass through Head Amplifiers and Decoders to Playback Channel Selectors which operate to route the signals from the appropriate head to each of the Playback Channels. The Record and the Playback Channel Selectors are controlled by means not shown to achieve the Head utilisation given in FIG. 1. Two possible positions for buffer stores are shown. That shown at the bottom right yields a Buffer Store function at lower cost than for the alternative case of five Buffer Stores of one quarter the size shown above and to the left. However the latter would permit even larger timing inaccuracies between heads. For normal applications the buffer store position after the Playback Channel Selectors is preferred and will be assumed from hereon.

Figure 3:
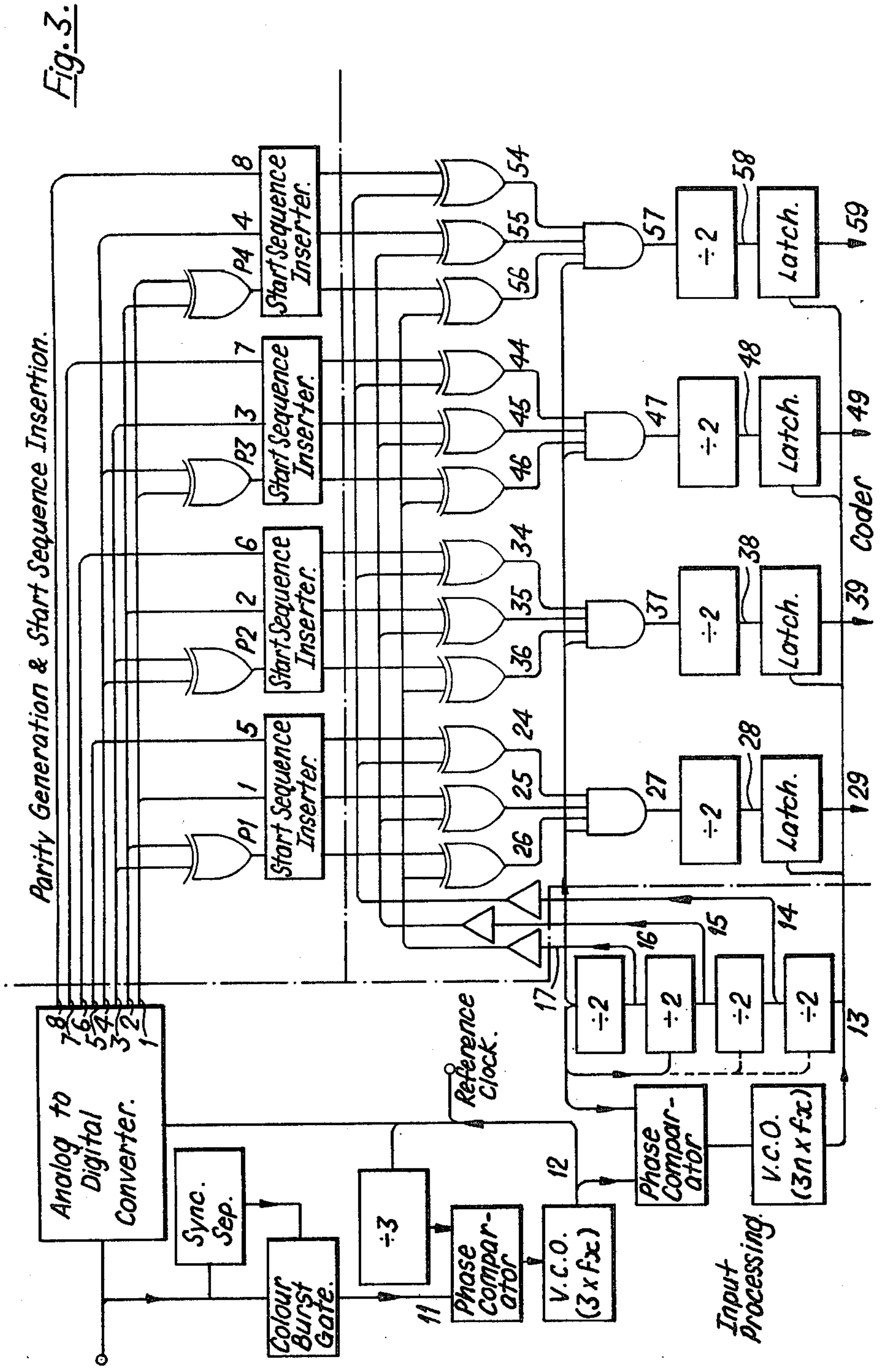

FIG. 3 shows how an analog input signal is processed to give the four Record Channel outputs 29, 39, 49 and 59. The analog video signal is sampled in the Analog-to-Digital Converter and quantised to yield eight bit binary words (256 possible magnitudes). The bits of these words occur simultaneously on the eight outputs numbered 1 to 8 inclusive, 1 being the most significant and 8 the least significant. The analog input signal also passes to a sync. separator which generates a pulse which permits the colour burst 11 to pass to one input of a Phase Comparator. The output of the phase comparator controls the frequency of a Voltage Controlled Oscillator VCO whose output is divided by three to give the other input to the Phase Comparator. By this means the frequency of the oscillator is maintained at precisely three times that of the incoming subcarrier and every third cycle of the oscillator has a defined phase relationship to that of the burst. The output 12 of the oscillator, the reference clock, is used to control the sampling process in the Analog Digital Converter and also is used as a reference by a further phase comparator controlling a further voltage controlled oscillator whose output 13 is divided by *n* in a binary counter with resets, and feeds back to the other input of the further phase comparator. In this particular description the factor *n* is 12.

Obviously for a recorder accepting a signal already in digital form, the inputs could be the eight bit words shown coming from the A/D converter and a reference clock.

The input digital data or that from the A/D converter are processed as follows. The input data corresponding to bits 2 and 3 feed an Exclusive-or Gate giving an output Parity 1 (P1) which will be low when the data on bits 2 and 3 is the same i.e. both low or both high. This may be seen from lines 2, 3 and P 1 on the waveform diagram given in FIG. 7. Under normal conditions Parity 1 and the data corresponding to bits 1 and 5 pass directly through the Start Sequence Inserter without modification and each passes to an input of three further Exclusive-or Gates with outputs 26, 25 and 24. The outputs 16, 15 and 14 of the binary counter are inverted and pass to the other inputs of these exclusive-or gates. Due to the action of these inverters, output 26 will be high when the states of 16 and P 1 are the same. Similarly output 25 and 24 are high when 1 corresponds with 15 and 5 corresponds with 14 respectively. When 17, 26, 25 and 24 are all high the output of the AND Gate goes high causing a reversal of the state of 28. The signal 17 is high for eight successive states of the divide by 12 counter and low for the remaining 4. Due to the number of gates the signal has passed through the Latch is used to retime the transitions of the output 29 to minimise the effects of propagation times.

In precisely the same way the other output signals 39, 49 and 59 are generated from their appropriate data.

The Start Sequence Inserters are used to generate a predetermined patters of ONES and ZERO's which need only occur when a head is starting to record a track but for television signals this could be repeated more often e.g. during each line blanking interval.

Figure 4:
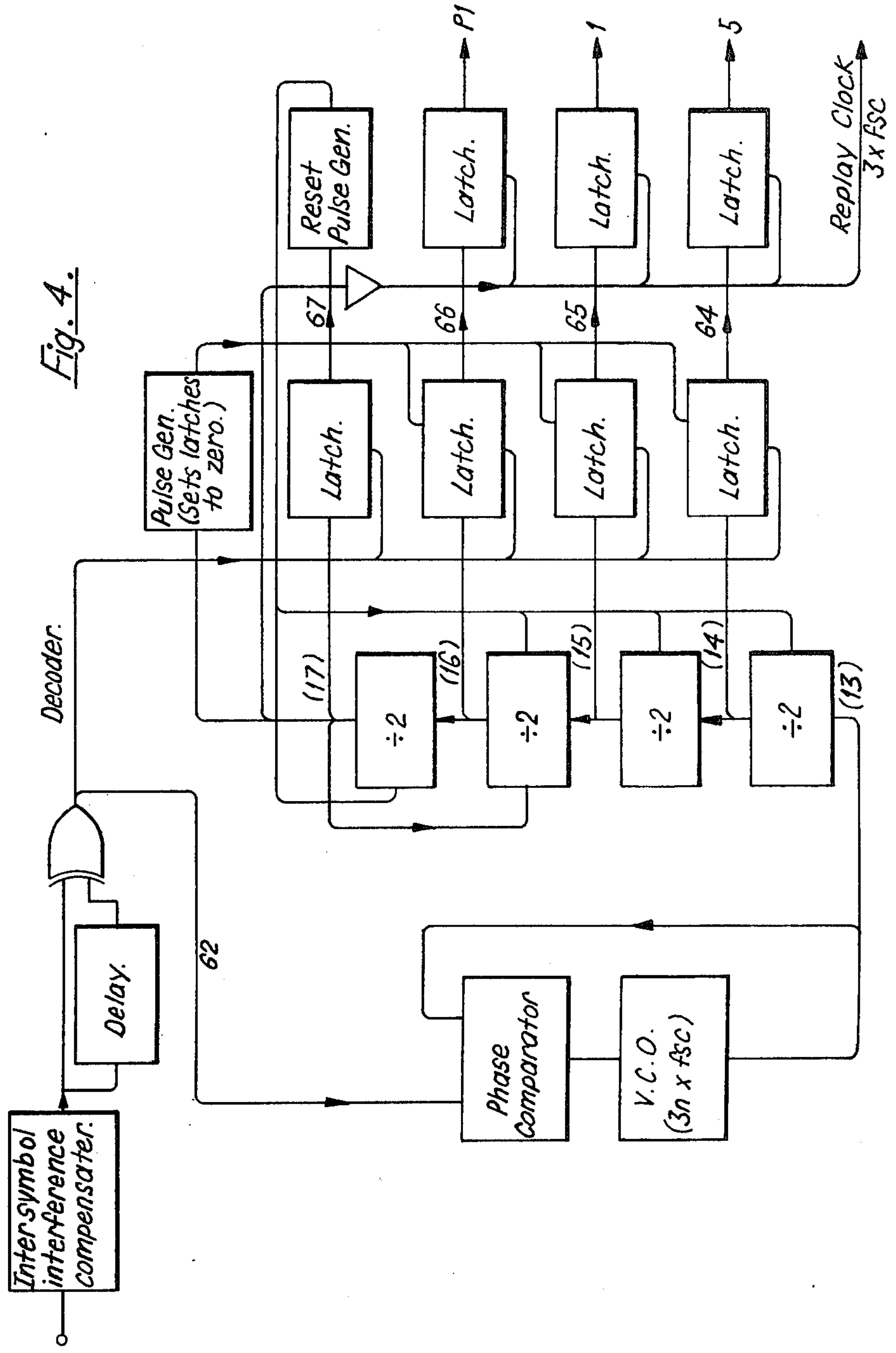

FIG. 4 shows how the replayed signal coming from each head amplifier is processed. Firstly the signal passes through an Intersymbol Interference Compensator which may conveniently be a transversal equaliser which is arranged to minimise intersymbol crosstalk. The signal from the compensator passes directly to an input of an exclusive-or gate and also via a delay to the other input of the same gate. The output 62 of this gate is a positive pulse of duration equal to the length of the delay line and starts when a transition occurs. These pulses pass to a Phase Comparator controlling the frequency of a Voltage Controlled Oscillator whose output is connected back to the other input of the phase comparator. The output of the Oscillator 13 is counted by a similar counter to that used in the record processing. Near the start of a complete cycle of operation, which lasts for one third of a cycle of sub-carrier, the outputs 66, 65 and 64 of three latches are set to zero. When a transition occurs the gate output pulse 62 causes the four output states of the counter 17, 16, 15 and 14 to be stored and they appear at latch outputs 67, 66, 65 and 64 respectively. At the end of the cycle the information at 66, 65 and 64 is transferred to the outputs of three additional latches to give P1, 1 and 5.

This assumes that the counter is correctly in step. A start sequence having the following three stages will inevitably result in correct synchronisation of the channel carrying P 1, 1 and 5.

| | P1 | 1 | 5 |
|---|---|---|---|
| 1st Stage | High | High | High |
| 2nd Stage | High | Low | Low |
| 3rd Stage | Low | Low | Low |

The same pattern for P 2, 2 and 6; P3, 3 and 7 and P 4, 4 and 8 will likewise ensure synchronisation. The means by which this is achieved is to consider the latch output 67 which should always be positive when correctly synchronised. If it is negative the counters are reset to the all low state. On the third stage of the start sequence this must result in correct synchronisation. Different start sequences have to be used if *n* is less than 12.

Figure 5:
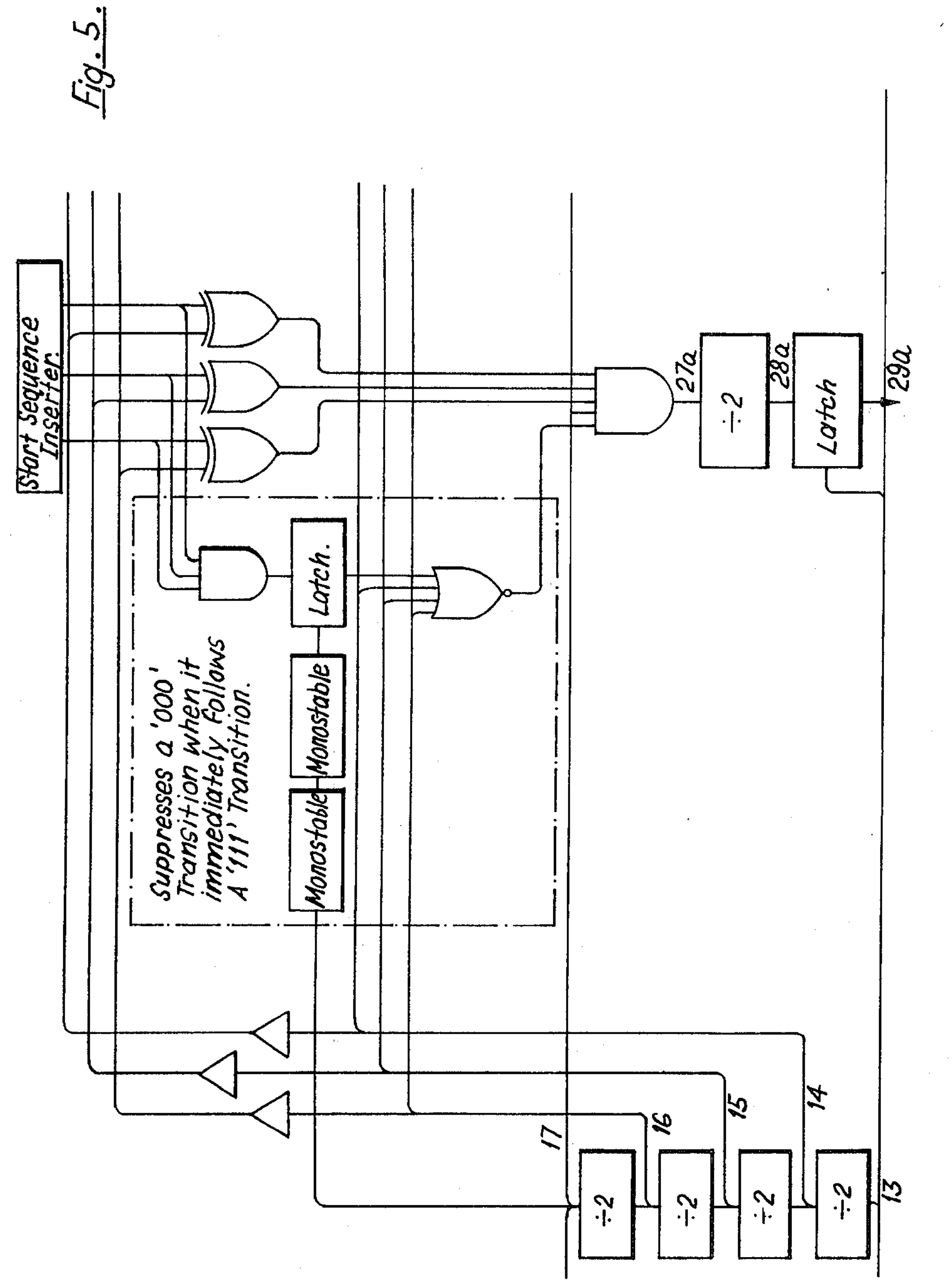

FIG. 5 shows the modifications required to the record processing if the 7 to 0 transition is to be implied. If the P 1, 1 and 5 data are all high during one word the output of the And Gate goes high. After the all low state of 16, 15 and 14 but before the end of the word the output of the And Gate is transferred to the input of the Nor Gate. During the succeeding all low state of 16, 15 and 14 the output of the Nor Gate will be low so preventing a transition being generated during that time as shown by *27a, 28a, 29a* compared to 27, 28 and 29.

Figure 6:
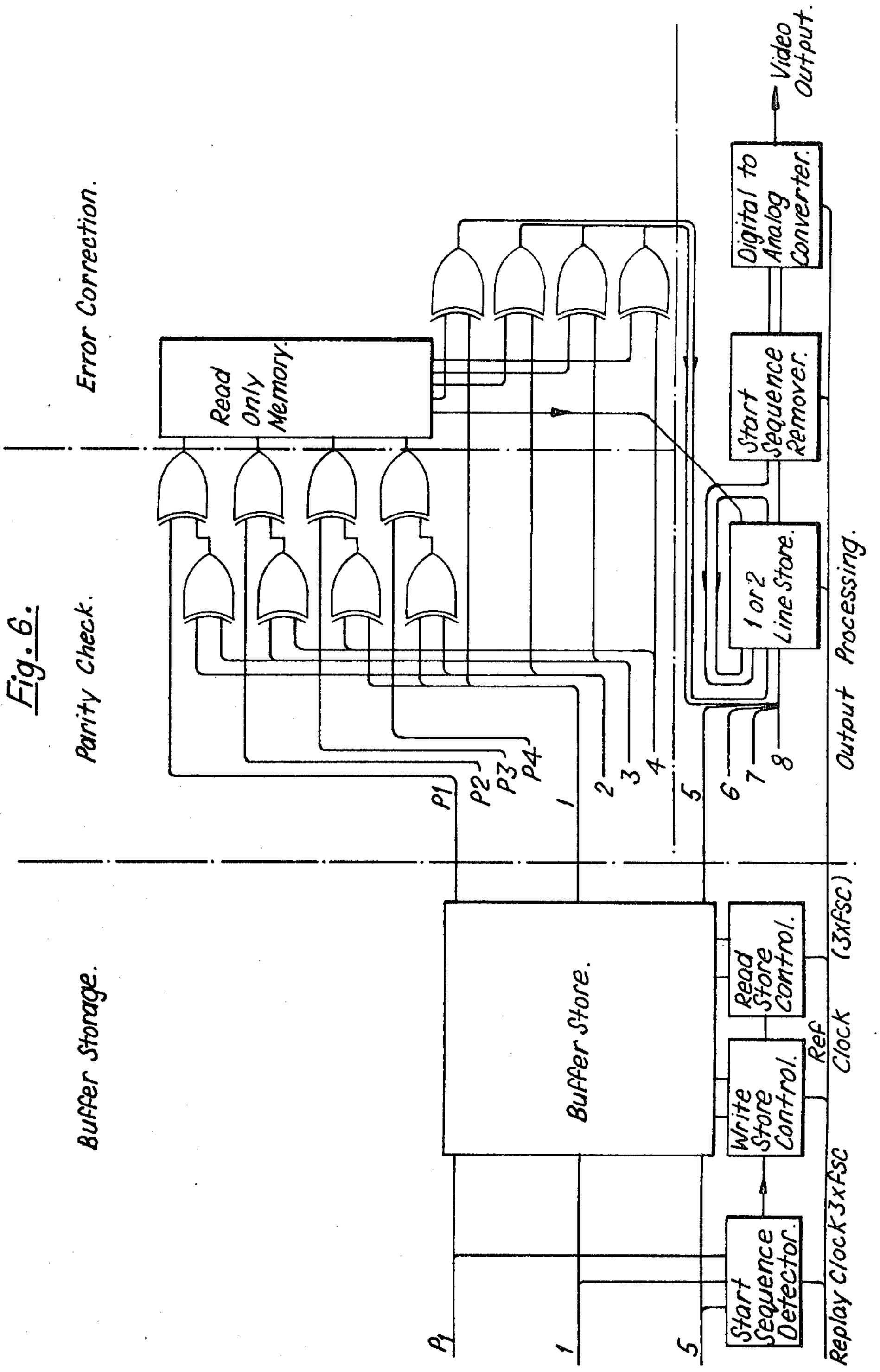

FIG. 6 shows the Buffer Storage, Parity Check, Error Correction and Output Processing. The Start Sequence can be extended so that the probability of normal picture information producing the same sequence can be reduced to insignificant proportions. Alternatively, a sequence such as 7, 4, 0, 2, 7, 4, 0 could be used which will have a nominal zero probability. In either case the chosen start sequence is used to control the writing of P 1, 1 and 5 into a quarter of the Buffer Store, the Replay Clock being used for precise timing. Similar apparatus will control the writing of the other data into the same store.

The information is read from the Buffer Store the precise timing now being determined by the Reference Clock. The parity of the data 1, 2, 3 and 4 is now generated and compared with the parity data P 1, P 2, P 3 and P 4. Normally the outcome of this parity checking will result in four low signals passing to the Read Only Memory. Depending on the type of probable data errors the Read Only Memory can be programmed to identify minor errors such as caused by a drop-out on one channel and to correct them by the use of the exclusive-or gates that bits 1, 2, 3 and 4 are passing through. However, for major errors such as the rare occurrence of simultaneous drop-outs on two or more channels the one or two Line Store goes into recirculation of all bits for the duration of this event so substantially removing the impairment.

It remains only to remove the Start Sequence and to convert back to analog form by a Digital to Analog Converter to obtain a video output signal of the normal analog type for transmission or display.

Figure 7:
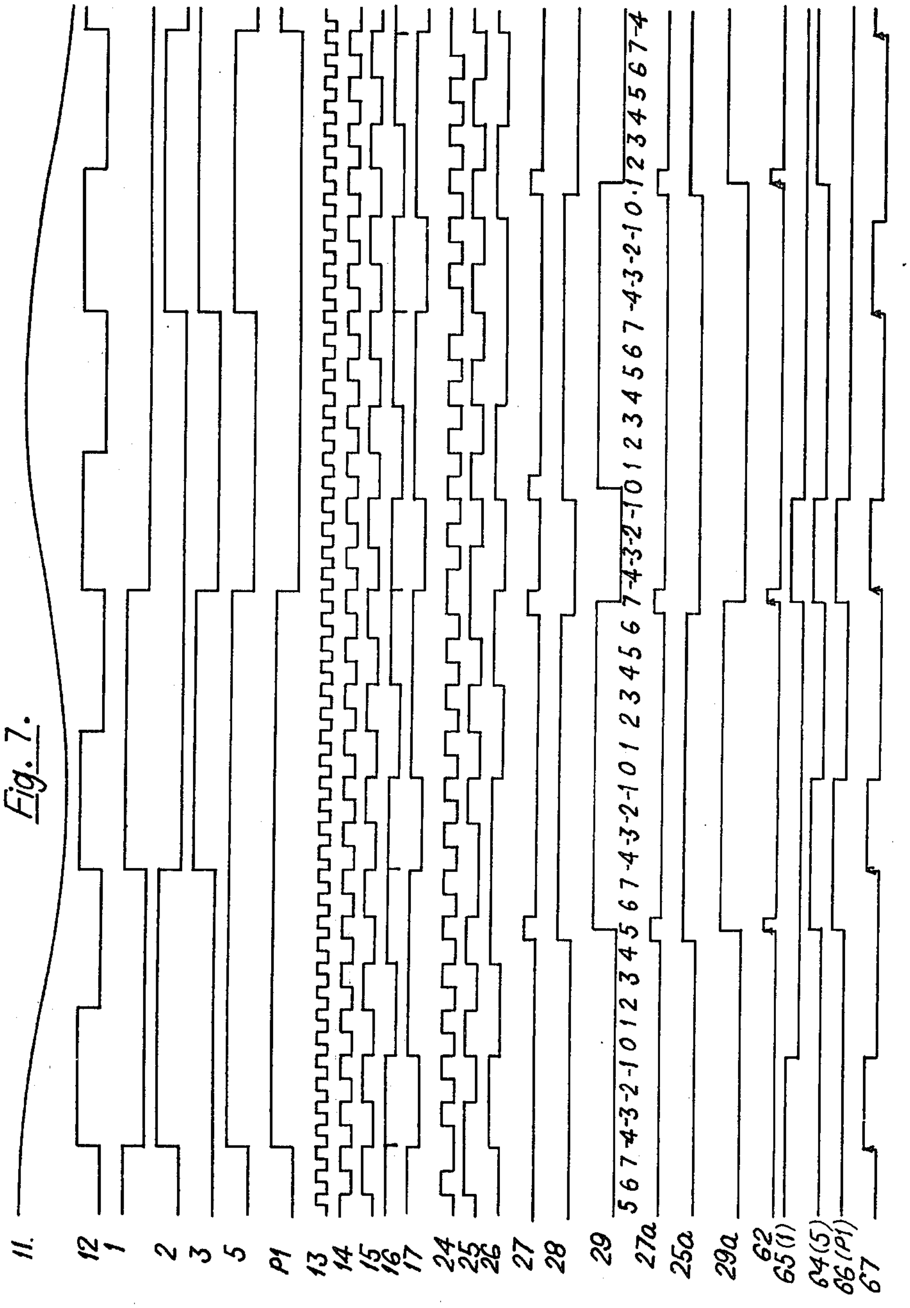

FIG. 7 shows waveforms at correspondingly numbered positions in the equipment.

In FIG. 1, the tape is shown as viewed from the centre of rotation of the heads and the widths of the tracks and guard bands therebetween are exaggerated in the interests of clarity. Tape already transversed by the heads is shown and tape about to be traversed is shown unshaded. Arrows X show the plane of the heads, arrow Y shows the direction of travel of the tape and arrow Z shows the direction of movement of the heads.

FIG. 8 shows an example of a mechanical arrangement suitable for the five heads. The heads A to E are mounted 72° apart upon a rotary head-disc so that they just project through a circumferential slot in a stationary cylindrical drum. The tape traverses the major part of the external surface of the drum, being guided by frusto-conical stationary guide members so that it is moved in the direction of the rotational axis of the head-disc during its circumferential traverse.

It will be understood that parity signals may be derived by any convenient logical processing of the signals to be checked. The parity signal may be any algebraic or other function of the signals.

The application of parity signals as described herein to cable or other transmission systems generally, irrespective of whether they involve recording or reproduction is to be regarded as falling within the ambit of the present invention.

I claim:

1. A recording apparatus for forming on a recording medium a recording of a series of digital words, each word consisting of a number of word bits and each word bit of a word having a different significance from the other bits of said word, onto a recording medium, said apparatus comprising a plurality of recording heads arranged to be in recording relationship with the recording medium simultaneously to form a corresponding plurality of recording tracks, and a recording circuit having 1. means for so distributing the word bits of each digital word among the heads that the most significant of the word bits of each digital word are each received by a different one of said heads and recorded on the medium thereby and the remainder of said word bits are divided among the heads and also recorded on the medium thereby,
2. parity generating means arranged to generate a set of parity bits from said most significant of the word bits of each digital words, and
3. means for distributing the set of parity bits among the heads for recording on the medium thereby, together with the word bits, in a distribution such that the parity bits of said set received and recorded by any one head are derived exclusively from those of said most significant bits received and recorded by the other heads.

2. Apparatus according to claim 1 in which the heads are magnetic recording heads for use with a recording medium in the form of magnetic tape.

3. Apparatus according to claim 1 having means for advancing the recording medium longitudinally and in which the recording heads are mounted by a turret which is rotatable with respect to the direction of longitudinal movement of the medium so that the relative motion of the heads relative to the medium has a transverse component and the heads are carried into and out of recording relationship with the medium by rotation of the turret and the number and positioning of said heads about the turret is greater than the number of heads in said plurality of heads, and the heads of said plurality at a particular time are heads mounted by the turret which are in recording relationship with the medium.

4. Apparatus according to claim 3 in which the number of heads mounted by the turret is such that the number of heads in recording relationship with the medium is at times equal to, and at other times greater than, greater than the number of heads in said plurality of heads.

5. Apparatus according to claim 4 in which the number of heads mounted by the turret is five.

6. A reproducing apparatus for reproducing a series of digital words, each word consisting of a number of word bits and each word bit of a word having a different significance from the other bits of said word, from a recording medium bearing a plurality of simultaneously reproducible recordings among which are distributed recorded word bits from each digital word arranged such that the most significant of the word bits of each digital word occur each on a different one of the recordings, and the remainder of said word bits are distributed among the recordings together with said most significant bits and recorded parity bits derived according to a parity code from said most significant bits of said word, said parity bits being arranged such that the parity bits of any one recording are derived exclusively from most significant word bits other that those of the said most significant word bits of said recording, said apparatus comprising reproducing heads for reproducing said recordings simultaneously each to yield reproduced most significant word bits, reproduced word bits of said remainder, and reproduced parity bits, a parity generator for deriving further parity bits according to said parity code from the reproduced most significant word bits, fault detector means operable to detect fault conditions involving the most significant word bits and reject those most significant bits detected as involving fault conditions whilst passing the others thereof by comparison of the derived parity bits with the reproduced parity bits and output means responsive, to provide as output, the said remainder of said word bits as reproduced to said reproducing heads together with only said others of the most significant bits.

7. A recording of digital words each word consisting of a number of word bits and each word bit of a word having a different significance from other bits of said word, said recording comprising a recording medium having thereon a set of separately and simultaneously readable recordings each of which contains word bits and parity bits, said word bits being so distributed among the recordings that the most significant bits of any word are contained each of a different one of the recordings and the remaining bits of said word are contained by the same recordings as said most significant bits, said parity bits being derived from said most significant bits and so distributed among the recordings that the parity bits contained on any one recording are derived exclusively from those of the most significant bits which are contained on others of said recordings.

* * * * *

UNITED STATES PATENT OFFICE
CERTIFICATE OF CORRECTION

Patent No. 3,921,132 Dated November 18, 1975

Inventor(s) John Lewis Edwin BALDWIN

It is certified that error appears in the above-identified patent and that said Letters Patent are hereby corrected as shown below:

Column 3, line 53, "Head utilisation" should read -- Head Utilisation --;

Column 8, line 17, claim 6, "to" should read -- by --;

Column 8, line 27, claim 7, "of a" should read -- on a --.

Column 2, line 46, "longitudinal" should read --longitural--

Column 6, line 13, after "shown" insert --shaded--.

Signed and Sealed this

*Nineteenth* Day of *August 1980*

[SEAL]

*Attest:*

SIDNEY A. DIAMOND

*Attesting Officer* *Commissioner of Patents and Trademarks*